H. R. HUGHES.
EARTH BORING DRILL.
APPLICATION FILED JUNE 16, 1921.

1,412,942.

Patented Apr. 18, 1922.
2 SHEETS—SHEET 1.

HOWARD R. HUGHES - INVENTOR.

BY Jesse R. Stone

ATTORNEYS.

H. R. HUGHES.
EARTH BORING DRILL.
APPLICATION FILED JUNE 16, 1921.

1,412,942.

Patented Apr. 18, 1922.
2 SHEETS—SHEET 2.

HOWARD R. HUGHES - INVENTOR.

BY Jesse R. Stone

ATTORNEY.

UNITED STATES PATENT OFFICE.

HOWARD R. HUGHES, OF HOUSTON, TEXAS.

EARTH-BORING DRILL.

1,412,942.         Specification of Letters Patent.    Patented Apr. 18, 1922.

Application filed June 16, 1921. Serial No. 477,935.

*To all whom it may concern:*

Be it known that I, HOWARD R. HUGHES, a citizen of the United States, residing at Houston, Harris County, Texas, have invented a certain new and useful Improvement in Earth-Boring Drills, of which the following is a full, clear, and exact description, such as will enable others skilled in the art to which it appertains to make and use the same.

My invention relates to earth boring drills of the multiple blade type.

The object of my invention is to provide a bit for all kinds of well drilling and which is adapted for cutting soft formations such as gumbo, clay, sand, etc., as well as harder material such as rock. Because of a multiplicity of blades the cutters will remain in good cutting condition for long periods of time and will be so positioned as to assist in the operation of the drill.

Another object is to provide a constructon of bit which will not easily clog in drilling but will tend to automatically clear itself of adhering material.

Figure 1:
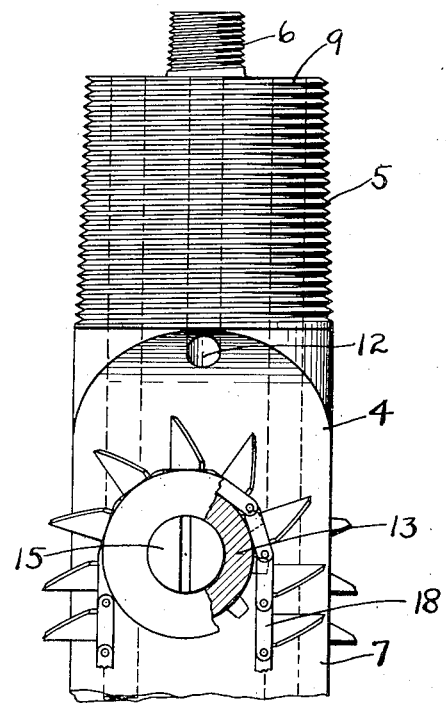
Figure 2:
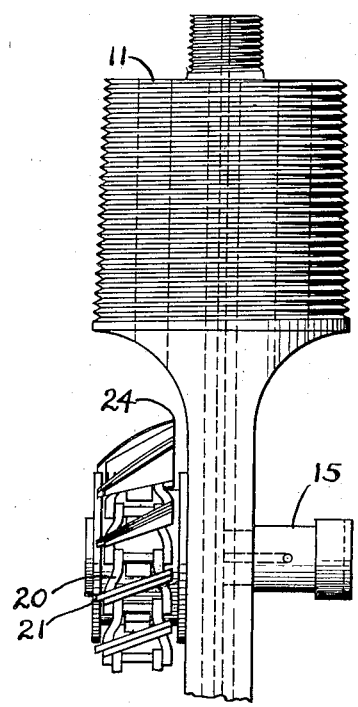
Figure 3:
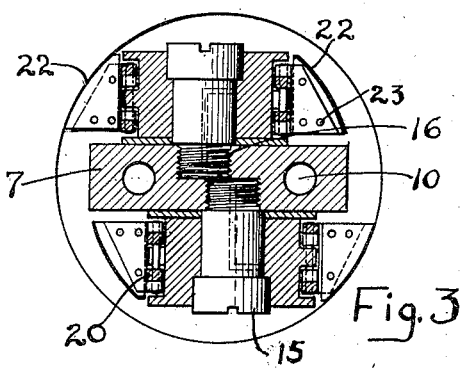
Figure 4:
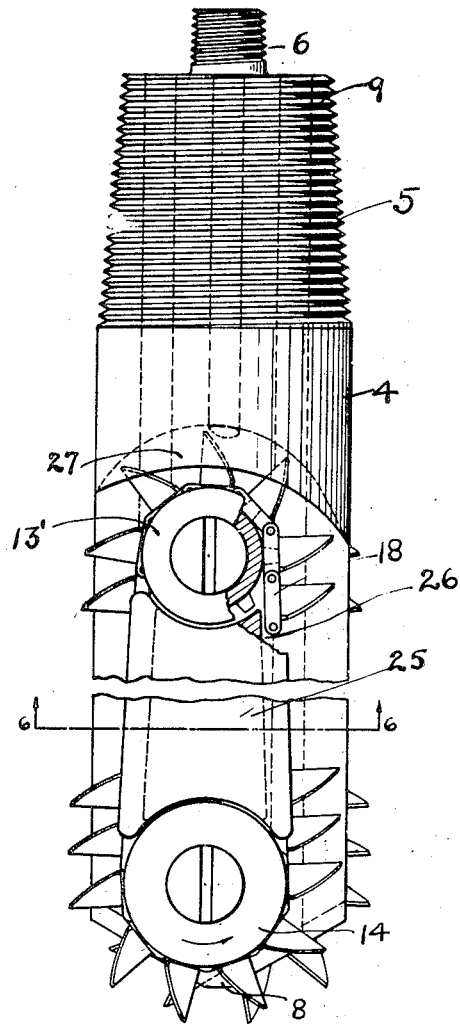
Figure 5:
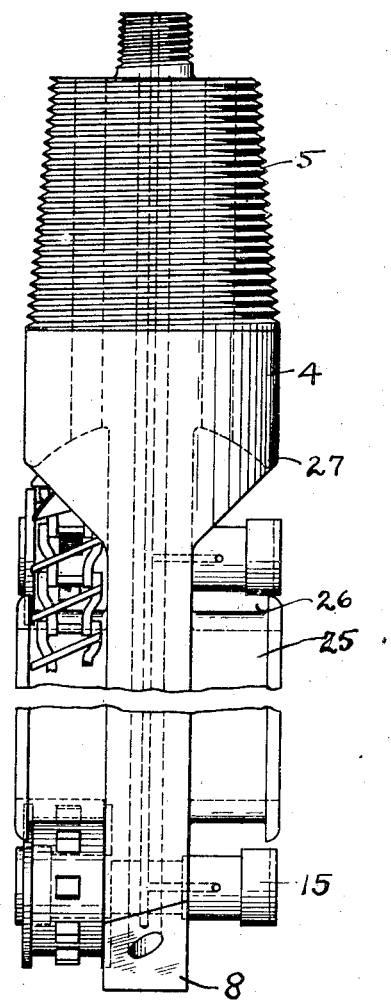
Figure 6:
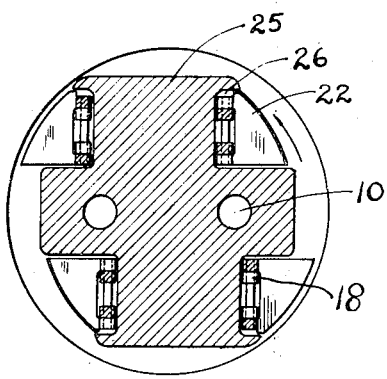

Referring to the drawings forming a part of this specification and wherein like numerals of reference are applied to like parts in all the views, Fig. 1 is a side elevation of a drill bit embodying my invention; Fig. 2 is a similar elevation taken at right angles to the view shown in Fig. 1 with some of the parts removed for greater clearness; Fig. 3 is a transverse section on the line 3—3 of Figure 1; Figs. 4 and 5 are side elevational views showing another embodiment of my device and Fig. 6 is a transverse section on the plane 6—6 of Fig. 4.

In carrying out my invention I contemplate employing a head 4 which has a threaded shank 5 at the upper end thereof, said shank having a reduced threaded nipple 6 thereon for the attachment of a lubricator. The main body of the head as shown in Figs. 1–3 inclusive, consists of an elongated flattened member 7, flattened in the manner of the blade on a fish-tail bit, but of considerably greater length. I contemplate using a blade of from three to four feet to as long as ten feet in length. The lower end of the body member is tapered to a point, as shown at 8, and longitudinal channels 9 for flushing water are bored longitudinally of the shank and the body member so as to discharge on the tapered end portion at 10. There are two of these channels, one on each side, thereby providing for free discharge of flushing fluid upon the bottom of the hole. I also provide two similar channels 11 in the shank of the bit, which, however, discharge at the upper end of the head at 12 so as to direct jets of flushing fluid downwardly upon the blades of the cutters.

On the sides of the flat portion of the head I mount two sprocket wheels or pulleys 13 at the upper end and two similar sprocket wheels 14 at the lower end. These sprocket wheels are supported on transverse shafts 15, said shafts being threaded for attachment within recesses 16 formed in the side of the head to receive them. The two pairs of shafts at the upper and lower ends of the blade are preferably offset, as shown particularly in Fig. 3, relative to the axis of rotation of the head, so as to bring the cutting blades into contact with the side of the hole at one side only, that side being the forward advancing side of the bit. The wheels 13 and 14 are provided with sprockets 17 thereon to receive a chain 18. The wheels also have outer and inner flanges 19 to better retain the chain in position upon the wheel.

The chain 18 is made up of separate links 20, the shape of which is shown best in Fig. 2. On the outer side of each of the links is secured a cutting blade 21. This blade is an approximately triangular-shaped cutting member, the outer edge of which is curved at 22 to conform to the curvature of the side of the hole. As shown particularly in Fig. 3, each blade is secured by screws or rivets 23 to a supporting member, which is in turn bolted to the link in rigid position. These blades may also be made integral with the body of the chain link as shown in Fig. 4. Each of the blades is set at an angle relative to the link in such manner that the forward point 24 is slightly in advance of the lower edge thereof. This positioning of the blade at an angle as shown, will assist in the rotation of the cutters about the wheels upon which they are mounted, the action being a sort of screw-action so that in the rotation of the head of the drill the cutting edge 22 of the cutters will contact with the side of the hole, the forward edge striking the material in advance of the rest of the blade and serving to shove the blade, and the chain upon which it is mounted, in its proper direction of rotation. The cutting blades shown are intended particularly as soft formation blades. When hard formation is encountered the blades may be shorter and heavier.

In the operation of my improved bit by the rotary system the rotation of the head will cause the blades at the lower end of the hole to dig into the material and have the usual rolling action on the bottom of the hole similar to the cutters of the ordinary roller bits. Further than this the inclined arrangement of the cutters relative to the side of the hole will, as already explained, serve to assist in advancing the blades relative to the side of the hole, and thus cause an efficient rotation of the sprocket wheel and the chain mounted thereon. In soft formation difficulty is ordinarily experienced in that the blades of the bit are apt to become clogged with material and "ball up" so that the blades will cease to function and some action will then be necessary to remove the mud from the bit before further progress can be made. In my type of bit, however, if some material adheres to the blades as they come in contact with the bottom of the hole, this material will be easily removed before the blade again comes in contact with the bottom of the hole, due to the fact that the blades must travel upwardly as the chain moves from the lower wheel up over the upper wheel and the blades will be subjected to the action of the flushing fluid during this period of travel. Furthermore, when the blades round the upper wheel the outer edges thereof are spread somewhat further apart at the point where they are subjected to a strong stream of flushing water coming down through the channels 12 and material will thus be broken and washed away from the blades so that when they again contact with the side or bottom of the hole they will be free of adhering material.

Attention is also called to the fact that a bit formed in this matter will serve not only to cut the bottom of the hole but will have a reaming action upon the sides of the hole and difficulties sometimes experienced, due to the loss of gauge in the diameter of the hole, will be largely eliminated. My improved bit is therefore a combination of drill and reamer or rather it has a combination of reaming and drilling functions, so that it will make it unnecessary to use, in connection with a bit of this type, any further device for reaming the hole.

In Figs. 4 to 6 inclusive, I have shown a slightly different embodiment of my invention. Here the chains 18 are adapted to move in a groove in the body of the head 4 which is extended laterally at 25 and a groove 26 countersunk therein to receive the chain. The lateral projection 25 extends from one wheel to the other but allows sufficient space for the free rotation of the wheels. Further the head is extended out over the upper wheel at 27 to form a shroud for the cutters.

In this embodiment also the upper wheel 13 is smaller in diameter than the lower one. For this reason the blades do not project so far beyond the head at the upper end, thus eliminating a tendency of the blades to drag on the side of the material. This will be serviceable in formations where little reaming action is desired and where the drag of the cutters interferes with the successful operation of the drill. The groove in which the cutter chain runs also protects the cutters and assists in preventing the drag of cutters on the material.

In the use of this type of bit with the cable tool rig, the reciprocation of the drill will cause the blades to scrape against the side of the hole and rotate the chain. The cutting blades acting on the bottom of the hole will thus be continually changing with the result that they will remain sharp much longer.

Having thus described my invention, what I claim as new and desire to protect by Letters Patent is:

1. In an earth boring drill, a head comprising a threaded shank, an elongated body thereon, two sprocket wheels on the upper ends of the faces of said body, two similar wheels on the lower end thereof, a sprocket chain fitting over the said upper and lower wheels and cutters on each of the links of said chain.

2. In an earth boring drill, a head comprising a threaded shank, an elongated body thereon, two offset sprocket wheels on the upper faces of said body, two similar sprocket wheels on the lower end thereof, a chain running over the upper and lower wheels on each side of said body and cutting blades on each of said links in the manner described.

3. In an earth boring drill, a head comprising an upper shank, an elongated body thereon, two sprocket wheels on each end of said body, the sprocket wheels on one side being in vertical alignment and offset relative to those on the other side, chains on said wheels and cutting means on said chains.

4. In an earth boring drill, a head comprising an upper shank, an elongated body thereon, two sprocket wheels at each end of said body, the sprocket wheels on each side being offset forwardly relative to the axis of rotation of the head, chains on said wheels and cutting blades on said chains.

5. In an earth boring drill, a head comprising a threaded shank, an elongated body thereon, sprocket wheels at the upper and lower ends of said body, a chain running over said wheels, said chain having links with outwardly extending cutting blades thereon, in the manner described.

6. In an earth boring drill, a head comprising an attaching shank, a flattened body thereon, sprocket wheels on said body in vertical alignment, chains running over said sprocket wheels and cutting blades on said chain, said blades having cutting edges shaped to conform to the curvature of the hole.

7. In an earth boring drill, a head comprising a threaded shank, an elongated body thereon, offset sprocket wheels at the upper and lower ends of said body, a chain on said wheels, cutting blades on said chain, said blades being set at an angle to the direction of movement of said chain to assist in the rotation of said wheels in the manner described.

8. In an earth boring drill, a head, an elongated body thereon, offset sprocket wheels at both ends of said body, chains running over said wheels, and cutting blades on said chains, said cutting blades being curved to conform to the curvature of the hole, the inner, longer side of each cutting blade being inclined downwardly in the direction of rotation of said head.

9. In an earth boring drill, a head, an elongated body thereon, offset sprocket wheels at both ends of said body, chains running over said wheels and cutting blades on said chains, said cutting blades being curved to conform to the curvature of the hole, the inner, longer side of each cutting blade being inclined downwardly in the direction of rotation of said head, and means to discharge flushing fluid upon said upper wheels.

10. In an earth boring drill, a head adapted for attachment to a drill stem, a flattened body member, sprocket wheels rotatable on bearings secured in said member, a chain fitting over said wheels, and means on said chain to disintegrate the material being drilled said chain being operated only by the movement of said head.

11. An earth boring drill comprising a head, an elongated body, a chain rotatable on sprocket wheels on said body, blades on said chains adapted to cut the material being drilled, and positioned to cause movement of said chain when said drill is operated.

12. In an earth boring drill, a head, an elongated body member, sprocket wheels mounted on the upper and lower ends thereof, the upper of said wheels being smaller in diameter than the lower, a chain on said wheels and cutting blades on said chain, said chain being moved on said wheels by the operation of said head.

13. In an earth boring drill, a head, an elongated body member, sprocket wheels mounted on the upper and lower ends thereof, a chain on said wheels and cutting blades on said chain, said chain moving in a groove in the side of said head.

In testimony whereof, I hereunto affix my signature, this the 7th day of June, A. D. 1921.

HOWARD R. HUGHES.